United States Patent [19]

Bluestein

[11] 4,014,851
[45] Mar. 29, 1977

[54] POLYOLEFIN-FILLED VINYLORANOPOLYSILOXANE COMPOSITION AND METHOD OF PREPARATION
[75] Inventor: Ben A. Bluestein, Schenectady, N.Y.
[73] Assignee: General Electric Company, Waterford, N.Y.
[22] Filed: Dec. 26, 1973
[21] Appl. No.: 428,009
[52] U.S. Cl. .................. 260/42.26; 260/375 B; 260/42.29; 260/42.37; 260/42.56; 260/825; 260/827
[51] Int. Cl.$^2$ .................................. C08K 3/00
[58] Field of Search ............... 260/827, 875, 375 B, 260/29.1 SB, 42.26

[56] References Cited
UNITED STATES PATENTS

| | | | |
|---|---|---|---|
| 3,070,573 | 12/1962 | Beck | 260/827 |
| 3,449,290 | 6/1969 | Foster | 260/827 |
| 3,627,836 | 12/1971 | Getson | 260/827 |
| 3,671,480 | 6/1972 | Wada et al. | 260/29.1 SB |
| 3,674,891 | 7/1972 | Wheeler, Jr. | 260/827 |
| 3,678,003 | 7/1972 | Kaiser et al. | 260/827 |
| 3,686,356 | 8/1972 | Saam | 260/827 |

Primary Examiner—Murray Tillman
Assistant Examiner—Thurman K. Page
Attorney, Agent, or Firm—E. Philip Koltos; Edward A. Hedman; Rocco S. Barrese

[57] ABSTRACT

Polyolefin-filled vinylorganopolysiloxane dispersions, which are stable fluid dispersions comprised of a continuous phase of essentially ungrafted vinylorganopolysiloxane and a discontinuous phase of finely divided solid particles of a homopolymer or copolymer prepared from an organic monomer or monomers, said monomer or monomers having aliphatic unsaturation, polymerized in the presence of said vinylorganopolysiloxane and methods of preparation are provided. Room temperature vulcanizable compositions utilizing these novel dispersions and the cured products thereof are also provided.

25 Claims, No Drawings

POLYOLEFIN-FILLED VINYLORANOPOLYSILOXANE COMPOSITION AND METHOD OF PREPARATION

This invention relates to modified organopolysiloxanes and more particularly to polyolefin-filled vinylorganopolysiloxanes.

Addition curable room temperature vulcanizable (RTV) organopolysiloxane compositions are well known and have found varied applications. Generally, these addition curable RTV compositions are two-component systems wherein one component is comprised of an olefinicorganopolysiloxane and a platinum catalyst, and the second component is comprised of an organohydrogenpolysiloxane cross-linking agent. When the two components are mixed, curing takes place spontaneously at room temperature.

It is well known to incorporate various additives into these RTV organopolysiloxane compositions to improve their properties. Included among these additives are inorganic fillers, such as silica aerogel, diatomaceous earth, calcium carbonate, graphite, iron oxide, etc., which, among other purposes, are generally added to act as reinforcing agents.

The use of inorganic fillers of this nature, however, has not met with total satisfaction. For example, in the case of silica fillers, the slight improvement realized by their presence in the RTV composition is outweighed by their high cost and formulation difficulties which they present. Likewise, graphite reinforcing fillers sometimes impart intense color to the RTV organopolysiloxane composition which is undesirable in many applications.

Other methods directed at improving the properties of RTV organopolysiloxane compositions have also been used in the past. For example, U.S. Pat. No. 2,965,593 to Dietz discloses that a water-repellant organopolysiloxane composition is provided by dispersing an organopolysiloxane in a vinyl monomer and polymerizing the mixture. The resultant material is characterized therein as a mixture of the organopolysiloxane in a thermoplastic high polymer matrix.

Further attempts to improve the properties of organopolysiloxanes are disclosed, for example, in U.S. Pat. Nos. 3,631,087, 3,627,836, 3,580,971, 3,441,537, 3,436,252, 3,070,573, 2,959,569 and 2,958,707. Generally, these patents disclose grafted organopolysiloxanes, i.e., orangopolysiloxanes which are chemically grafted with polymeric side chains. In particular, U.S. Pat. No. 3,070,573 to Beck discloses grafted organopolysiloxanes obtained by contacting an organopolysiloxane in which at least 0.001 mole percent of the silicon atoms have at least one unsaturated nonaromatic hydrocarbon group, such as vinyl, attached thereto through silicon-carbon bonds with ozone and subsequently with an olefinic monomer.

It is noted, however, that while graft modified organopolysiloxanes have some desirable properties, they are inadequate in others, such as poor solvent resistancy, and accordingly have also not met with complete satisfaction.

SUMMARY OF THE INVENTION

Accordingly, it is one object of this invention to provide novel improved modified-vinylorganopolysiloxane compositions.

It is another object of this invention to provide improved modified-vinylorganopolysiloxane compositions which, without necessarily utilizing conventional inorganic filler materials, provide equal or improved and different physical properties when compared with conventionally filled vinylorganopolysiloxane compositions.

Still another object of this invention is to provide improved modified vinylorganopolysiloxane compositions which are essentially free of grafted vinylorganopolysiloxane units.

A still further object of this invention is to provide novel processes for the preparation of the improved modified-vinylorganopolysiloxanes of the present invention as well as to provide novel and improved vulcanizable compositions and cured products thereof.

These and other objects are achieved herein by providing modified-vinylorganopolysiloxanes which are characterized as stable polyolefin-filled vinylorganopolysiloxane dispersions comprised of two phases:
i. a continuous phase comprising an essentially ungrafted vinylorganopolysiloxane and intimately dispersed therein
ii. a discontinuous phase comprising finely divided solid particles of an ungrafted polymer prepared from an organic monomer having aliphatic unsaturation or mixture of such monomers polymerized in the presence of said essentially ungrafted vinylorganopolysiloxane.

DETAILED DESCRIPTION OF THE INVENTION

The polyolefin-filled vinylorganopolysiloxane dispersions of the present invention are prepared by the insitu polymerization of an organic monomer or monomers having aliphatic unsaturation in a vinylorganopolysiloxane fluid in the presence of a free radical initiator. Surprisingly, the resulting composition is a stable dispersion wherein a discontinuous phase of finely divided homopolymer or copolymer of the starting organic monomer or monomers is intimately dispersed in a continuous matrix of essentially ungrafted and essentially unaltered vinylorganopolysiloxane.

The finely divided solid particles of homopolymer or copolymer which are formed in-situ are of preformed small enough diameter so that they act as reinforcing or semi-reinforcing fillers or in some cases extending fillers for the vinylorganopolysiloxane matrix material, resulting in an improved stronger silicone elastomer product. Generally, the major portion of these solid particles of homopolymer or copolymer have an average diameter of less than about 10–15 microns, with some having a diameter of less than one micron.

While the polyolefin-filled vinylorganopolysiloxane dispersions of the present invention may be prepared by simply heating the preformed mixture of components, namely, the organic monomer or monomers, the vinylorganopolysiloxane and the free-radical initiator, other procedures are contemplated herein.

For example, the organic monomer or monomers may be gradually added in increments to a preformed heated and stirred mixture of the vinylorganopolysiloxane and the free-radical initiator. Another procedure contemplated herein is the gradual incremental addition of a preformed mixture or solution of organic monomer or monomers and free-radical initiator to the heated vinylorganopolysiloxane.

Regardless of which procedure is used, the organic monomer or monomers are homopolymerized or copolymerized insitu, i.e., in the presence of the vinylorganopolysiloxane and suprisingly essentially no grafting, condensation or other alteration occurs with regard to the vinylorganopolysiloxane starting material.

In all of the hereinabove described processes for preparing the present dispersions, the polymerization catalyst, i.e., the free-radical initiator, may be any of the well-known or conventional free-radical initiators. Among these are included, for example, organic peroxides, such as benzoyl peroxide, 2,4-dichlorobenzoyl peroxide, dialkyl peroxides, like di-tert-butyl peroxide and dicumyl peroxide; hydro-peroxides, such as tert-butyl hydroperoxide, cumyl hydroperoxide, and decylene hydroperoxide; cyclic peroxides such as ascaridole and 1,5-dimethylhexane-1,5-peroxide; peresters, such as tert-butylperbenzoate, tert-butyl-peroxyisopropyl carbonate, tert-butylperoctoate, and tert-butyl-peracetate. The well-known azo compounds are also useful herein as free-radical initiators. These include, for example, those azo compounds containing tertiary carbon atoms (that is, carbon atoms having no hydrogen attached thereto) attached to each nitrogen atom of the azo linkage. The remaining valences of the tertiary carbon are satisfied by nitrile radicals, carboxyalkyl radicals, cycloalkene radicals, alkyl radicals and radicals of the formula YOOC in which Y is an alkyl radical. Specific examples of such azo compounds are:

Me$_2$(NC)CN = NC(CN) Me$_2$
MeEt(NC)CN = (CN) MeEt
Et$_2$(NC)CN = NC(CN)Et$_2$
Pr$_2$(NC)CN = NC(CN)Pr$_2$
AmMe(NC)CN = NC(CN) MeAm
(HOOCCH$_2$CH$_2$)Me(NC)CN = NC(CN)Me(CH$_2$CH$_2$COOH)
(MeOOC)Me$_2$CN = NCMe$_2$(COOMe)
(EtOOC)Me$_2$ = NCNe$_2$(COOEt).

The symbols Me, Et, Pr and Am represent methyl, ethyl, propyl, and amyl, respectively. Preferred free-radical initiators within the scope of the present invention are benzoyl peroxide, tert-butyl peroctoate and azobis (isobutyronitrile).

The temperature of the in-situ polymerization reaction of the present invention may vary. Generally, however, the temperature should be sufficient to form free radicals at a rate such as to effect the polymerization of the organic monomer or monomers in a reasonable length of time, but insufficient to result in grafting of the vinylorganopolysiloxane with polymeric side chains. Specifically, these temperatures are from about 35° C to about 135° C and preferably from about 45° C to about 125° C.

Because of the free radical nature of the polymerization process, it is important that the reaction be maintained in an oxygen-free environment, such as by sweeping the reaction vessel with nitrogen. Furthermore, solvents for dissolving the free-radical initiator and/or organic monomer or monomers such as acetonitrile, chain transfer agents or other conventionally employed polymerization additives can be present during the reaction to modify the reaction and/or which may modify the product.

Moreover, the in-situ polymerization process of the present invention can be carried out at subatmospheric, atmospheric or superatmospheric pressure. Preferably, atmospheric pressures are employed. Depending upon the particular conditions employed, the polymerization reaction is generally completed in about 30 minutes to about 10 hours. If it is desired to perform the in-situ polymerization reaction of the present invention by incrementally adding the organic monomer or monomers to the reaction vessel containing the vinylorganopolysiloxane, the portion of increments used and time used is not critical and may vary. However, generally, incremental addition is completed from about 10 minutes to about 5 hours.

The organic monomers which are useful to prepare the polyolefin-filled vinylorganopolysiloxane dispersions of the present invention may be any polymerizable olefinic monomer. Examples of suitable monofunctional olefinic compounds are low molecular weight straight chain hydrocarbons, such as ethylene, propylene, butylene and the like; halogenated straight chain hydrocarbons like vinyl halides, such as vinyl choride; vinyl esters, such as vinyl acetate; vinyl containing aromatics, such as styrene, ring substituted styrenes; other aromatics such as vinylpyridine and vinylnaphthalene; unsaturated acids, such as acrylic acid and derivatives thereof including salts, esters, such as ethyl acrylate, butyl acrylate, methylmethacrylate, amides and unsaturated nitriles, such as acrylonitrile; N-vinyl compounds, such as N-vinylcarbazole, N-vinylpyrrolidone, and N-vinyl caprolactam.

Moreover, disubstituted ethylenes of the type CH$_2$ = CX$_2$ may be used, including vinylidene fluoride, vinylidene choride, vinylidene cyanide, methacrylic acid, and compounds derived therefrom such as salts, esters and amides as well as methacrolein, methacrylonitrile, and the like.

Disubstituted ethylenes of the type CHX = CHX, such as vinylene carbonate and various monomers which polymerize best in the presence of other monomers, e.g., maleic anhydride, esters of maleic acid and fumaric acids, stilbene, indene and coumarone are also useful herein.

Examples of suitable polyfunctional olefinic monomers, i.e., having at least two olefinic linkages, are esters, such as allyl methacrylate, allyl acrylate, diallyl adipate, methallyl acrylate, methallyl methacrylate, vinyl acrylate, vinyl methacrylate; hydrocarbons such as divinylbenzene and vinyl cyclohexene; polyol esters of acrylic and methacrylic acid, e.g., ethylene dimethacrylate, tetramethylene diacrylate, and pentaerythritol and tetramethacrylate; and conjugated diolefins such as 1,3-butadiene, isoprene and chloroprene.

Any of these olefinic monomers mentioned hereinabove may be used singly or in combination in the practice of the present invention.

The vinylorganopolysiloxanes useful in the practice of the present invention are well known and have structural units corresponding to the formula:

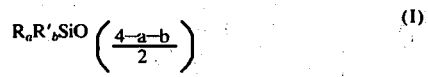    (I)

wherein R is an organic radical attached to silicon by a C—Si linkage and is selected from the group consisting of monovalent hydrocarbon radicals, halogenated monovalent hydrocarbon radicals, and cyanalkyl radicals; generally R contains from 1–30 carbon atoms, straight or branch chained, preferably from 1–12 carbon atoms, and most preferably from 1–8 carbon atoms; R' is vinyl, i.e., CH$_2$=CH—, attached to silicon by a C-Si linkage; $a$ has a value of from 0 to 2.5, inclusive, and preferably from 0.5 to 2.1, inclusive, $b$ has a value from 0.0005 to 2.0, inclusive, and the sum of $a$ and $b$ is equal to from 1.0 to 3, inclusive. Vinylorganopolysiloxanes of this type are disclosed, for example, in U.S. Pat. No. 3,344,111 to Chalk, incorporated herein by reference.

Included among the radicals which R in Formula I represents are alkyl, such as methyl, ethyl, propyl, isopropyl, butyl, octyl, dodecyl, and the like; cycloalkyl such as cyclopentyl, cyclohexyl, cycloheptyl, and the like; aryl, such as phenyl, naphthyl, tolyl, xylyl, and the like; aralkyl, such as benzyl, phenyethyl, phenylpropyl, and the like; halogenated derivatives of the aforesaid radicals including chloromethyl, trifluoromethyl, chloroproyl, chlorophenyl, dibromophenyl, tetrachlorophenyl, difluorophenyl and the like; cyanoalkyl, such as beta-cyanoethyl, gammacyanopropyl, beta-cyanopropyl and the like. Moreover, Formula I is intended to include those materials wherein R is a mixture of the aforesaid radicals. Preferably, R is methyl. For the purposes of this invention the vinylorganopolysiloxanes represented by Formula I above have a viscosity in the range of about 10 to about 10,000,000 centipoise at 25° C, and preferably within the range of about 50 to about 5,000,000 centipoise at 25° C.

It is to be understood, of course, that Formula I is intended to include organopolysiloxanes which are vinyl terminated, or contain the vinyl groups along the chain or which are vinyl terminated and also contain vinyl groups along the chain.

A preferred class of vinylorganopolysiloxanes within the scope of Formula I above are those commonly referred to as vinyl-stopped diorganopolysiloxanes, such as, for example, those having the general formula

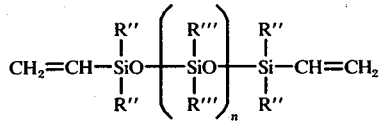

wherein R'' and R''' may be the same or different and are monovalent hydrocarbon radicals free of aliphatic unsaturation, the same as R in Formula I, with at least 50 mole percent of the R''' group being methyl and where $n$ has a value sufficient to provide a viscosity of from about 50,000 to 750,000 centipoise at 25° C, preferably from about 50,000 to 150,000. Of these, the vinyl-stopped dimethylpolysiloxanes, i.e., where the R'' and R''' groups are methyl, are most preferred. These vinyl-stopped diorganopolysiloxanes are also well known as evidenced by U.S. Pat. No. 3,436,366, incorporated herein by reference.

Other specific materials included within the scope of Formula I above are, for example, low molecular weight materials, such as vinylpentamethyl disiloxane, 1,3-divinyl tetramethyldisiloxane, 1,1,3-trimethyldisiloxane, 1,1,3,3-tetravinyldimethyldisiloxane, as well as higher polymers containing up to 100,000 or more silicon atoms per molecule. Also included within the scope of the polysiloxanes of Formula I are cyclic materials containing silicon bonded vinyl, such as the cyclic trimer, tetramer or pentamer of methylvinylsiloxane (($CH_2$=CH) ($CH_3$)SiO). Among these cyclic materials tetramethyltetravinylcyclotetrasiloxane is preferred.

The vinylorganopolysiloxanes of Formula I above can also be characterized as copolymers of (1) siloxane units having the formula:

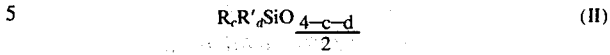

wherein R and R' are as defined above and $c$ has a value of from 0 to 2, inclusive, $d$ has a value of from 1 to 2, inclusive and the sum of $c$ and $d$ is equal to 1.0 to 3.0, inclusive, and (2) organopolysiloxane units having the structural formula

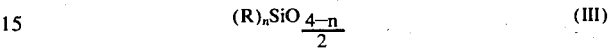

where R is defined above and $n$ has a value of from 1.0 to 3, inclusive. Thus, where the vinylorganopolysiloxane employed herein is a copolymer of siloxane units within the scope of Formula II with an organopolysiloxane having an average formula within the scope of Formula (III), the copolymer generally contains from 0.1 to 99.5 mole percent of Formula II, and from 0.5 to 99.9 mole percent of units within the scope of Formula III.

Also included among the vinylorganopolysiloxanes intended to be encompassed within the practice of the present invention are those polysiloxane compositions characterized as mixtures of organopolysiloxanes containing vinyl groups disclosed by U.S. Pat. No. 3,436,366 to Modic, incorporated herein by reference. Generally, these compositions comprise (1) a liquid vinyl chain-stopped polysiloxane having the formula:

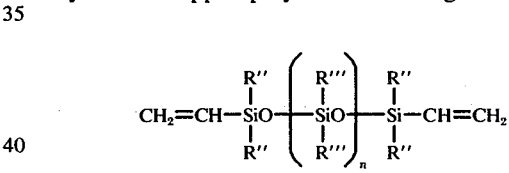

wherein R'' and R''' are monovalent hydrocarbon radicals free of aliphatic unsaturation, with at least 50 mole percent of the R''' group being methyl and where $n$ has a value sufficient to provide a viscosity of from about 50,000 to 750,000 centistokes at 25° C, preferably from about 50,000 to 150,000; preferably all the R'' and R''' groups are methyl; and (2) an organopolysiloxane copolymer comprising (R'')$_3$SiO$_{0.5}$ units and SiO$_2$ units, where R'' is selected from the group consisting of vinyl and monovalent hydrocarbon radicals free of aliphatic unsaturation, where the ratio of (R'')$_3$SiO$_{0.5}$ units to SiO$_2$ units is from about 0.5 : 1 to 1 : 1, and where from about 2.5 to 10 mole percent of the silicon atoms contain silicon bonded vinyl groups.

The amounts of materials employed in the processes and dispersion of the present invention can vary within wide limits. Thus, for example, the amount of free-radical initiator used in the in-situ polymerization of the present invention is not critical and in general is from 0.1% to 10% by weight of the total admixture of organic monomer or monomers and vinylorganopolysiloxane material. The amount of organic monomer or monomers used herein can also vary and is generally within the range of from about 5% to about 70% by weight of the total composition and preferably from about 10% to about 60% by weight of the total composition. The amount of vinylorganopolysiloxane material employed is generally about 30% to about 95% by weight of the total composition and preferably from about 40% to 90% by weight of the total composition.

The polyolefin-filled vinylorganopolysiloxane dispersions of the present invention are particularly useful in the manufacture of silicone elastomers, resins and fluids, which are useful in molding compositions, potting compositions for electrical components, coatings and other uses for which organosilicon compositions of this type have become well known.

Thus, room temperature vulcanizable (RTV) compositions employing the polyolefin-filled vinylorganopolysiloxane dispersions of the present invention are also within the scope of the present invention. Generally, these RTV compositions are comprised of 1. a polyolefin-filled vinylorganopolysiloxane dispersion, as prepared by the present invention and described above,
2. an organohydrogenpolysiloxane crosslinking agent, and
3. a platinum catalyst.

The organohydrogenpolysiloxane crosslinking agent employed in the present RTV compositions can be any of those conventionally known and used for this purpose and, for example, disclosed in U.S. Pat. No. 3,344,111 and U.S. Pat. No. 3,436,366, which are incorporated herein by reference. These organohydrogenpolysiloxanes have structural units of the formula:

$$R_a SiH_b SiO_{\frac{4-a-b}{2}} \quad (IV)$$

wherein R, a, and b are as defined above. Accordingly, Formula IV is intended to broadly cover organopolysiloxanes which are preferably, but not necessarily free of olefinic unsaturation, but which contain silanic hydrogen.

These organohydrogenpolysiloxane crosslinking agents can also be characterized as copolymers containing at least one unit per molecule having the formula:

$$(R)_c(H)_d SiO_{\frac{4-c-d}{2}} \quad (V)$$

wherein c and d are as defined above and with the remaining siloxane units in the organopolysiloxane being within the scope of Formula III above.

Within the scope of Formula V are siloxane units, such as hydrogen siloxane units ($HSiO_{1.5}$) methyl hydrogen siloxane units ($HSiCH_3O$), dimethyl hydrogen siloxane units, and dihydrogen siloxane units ($H_2SiO$). In these copolymers, the siloxane units of Formulae III and V are present in proportions so as to form a hydrogenpolysiloxane within the scope of Formula IV above. In general, these copolymers contain from 0.5 to 99.5 mole percent of the siloxane units of Formula III with from 0.5 to 99.5 mole percent of the siloxane units of Formula V.

Specifically, organohydrogenpolysiloxanes encompassed within Formula IV above include 1,3-dimethyl-disiloxane, 1,1,3,3-tetramethyldisiloxane, as well as higher polymers containing up to 100,000 or more silicon atoms per molecule. Also intended to be included are cyclic materials, such as cyclic polymers of methyl hydrogen siloxane having the formula $(CH_3SiHO)_x$ wherein $x$ is a whole number equal to from 3 to 10 or more. Particularly included is tetramethylcyclotetrasiloxane.

The platinum catalyst employed in the RTV composition of the present invention can be any of the well-known platinum catalysts which are effective for catalyzing the reaction between silicon-bonded hydrogen groups and silicon-bonded olefinic groups. These materials include, for example, the finely divided elemental platinum catalysts, such as that described in U.S. Pat. No. 2,970,100 to Bailey, and platinum-on-charcoal, platinum-on-gamma-alumina, platinum-on-silica-gel, platinum-on-asbestos, the chloroplatinic acid ($H_2PtCl_6 \cdot 6H_2O$) catalysts described in U.S. Pat. No. 2,823,218 to Speier, the platinum hydrocarbon complexes, e.g., $(PtCl_2.Olefin)_2$, $H(PtCl_3.olefin)$, $(PtCl_2.C_3H_6)_2$, shown in U.S. Pat. No. 3,159,601 to Ashby and U.S. Pat. No. 3,159,662 to Ashby, as well as the platinum alcoholate catalysts described in U.S. Pat. No. 3,220,972 to Lamoreaux and the platinum chloride-olefin complexes described by Modic in U.S. Pat. No. 3,516,946. All of the aforesaid patents are intended to be incorporated herein by reference. Particularly preferred platinum catalysts are the platinum alcoholates as described in U.S. Pat. No. 3,220,972 to Lamoreaux.

Like conventional RTV compositions, the proportions of the organohydrogenpolysiloxane cross-linking agent and platinum cross-linking catalyst employed in the present RTV compositions can vary within wide limits. Thus, these proportions are affected by the stoichiometry of the reactants involved since many of the final products prepared from the compositions of this invention exhibit satisfactory properties for intended purposes even when the final product contains unreacted silicon-bonded vinyl radicals or unreacted silicon-hydrogen linkages. For economic and commercial purposes, it is generally preferred that the vinylorganopolysiloxane and the organohydrogenpolysiloxane be present in such proportions that the composition contains from about 0.005 to 20 silicon-hydrogen linkages per silicon-bonded vinyl radical. However, it is often most desirable to have an equal number of silicon-hydrogen linkages and vinyl groups in the composition so as to produce a final product which is substantially free of either silicon-hydrogen linkages or silicon-bonded groups.

Regardless of the type of platinum catalyst used, it is generally present in an amount related to the amount of vinyl radicals in the vinylorganopolysiloxane and in an amount sufficient to cause the co-reaction of the vinylorganopolysiloxane and the organohydrogenpolysiloxane. Thus, satisfactory results are obtained when the platinum catalyst is present in amounts sufficient to provide as little as one atom of platinum per million silicon-bonded vinyl radicals of the vinylorganopolysiloxane. On the other hand, amounts of the platinum catalyst sufficient to provide as high as one to ten platinum atoms per 1,000 silicon-bonded vinyl groups may also be used. Generally, however, it is preferred to employ the platinum catalyst in an amount sufficient to provide one platinum atom per one thousand to one million silicon-bonded vinyl groups in the vinylorganopolysiloxane component.

While the RTV compositions provided by the present invention can be prepared by premixing all the various ingredients in any desired fashion, it may be found more convenient to prepare these compositions in two separate portions or packages which are latter combined at a time the compositions are to be cured, i.e., converted to the solid elastic state. In the case of a two-package formulation, it is convenient to include in the first package the polyolefin-filled vinylorganopolysiloxane dispersion prepared according to the present invention, and the platinum catalyst. If other additives, generally used in compositions of this nature are desired, they, too, are conveniently placed in the first package. The second package generally contains as its ingredient the organohydrogenpolysiloxane cross-linking component.

When the two package system is employed, the two packages are merely mixed in suitable fashion at the point of use and the mixture cures at room temperature.

As a result of the presence of the polyolefin-filled vinylorganopolysiloxane dispersions described by the present invention, these RTV compositions are cured to rubbers having physical strength properties, such as tensile, tear, elongation, etc., which are equivalent to or better than those which employ more expensive and difficult to handle conventional inorganic fillers. In addition, the present RTV compositions employing the present polyolefin reinforcing fillers provide different and improved densities and surface appearances to the final product in comparison to prior art conventionally filled compositions.

Thus, while the RTV compositions of the present invention are sufficiently reinforced by the presence of the finely divided polyolefin fillers, the supplemental incorporation of conventional fillers for added reinforcement or other purposes is also contemplated herein. Thus, these conventional fillers may be added to the reaction mixture during the preparation of the polyolefin-filled vinylorganopolysiloxane dispersions of this invention or added thereto in any convenient fashion subsequent to their preparation. In the case of the two-package formulation described above, these conventional additives and fillers are conveniently included in the first package. Included among these conventional additives and fillers are, for example, formed silica, high surface area precipitated silicas, silica aerogels, as well as coarser silicas, such as diatomaceous earth, crushed quartz and the like; other fillers include metallic oxides, titanium oxide, ferric oxide, zinc oxide. Other additives contemplated above include, for example, pigments, antioxidants, process aids, plasticizers, viscosity control agents, and ultraviolet absorbers. The amounts of these materials added are of course dependent upon the particular supplemental properties desired and are within the knowledge of one skilled in the art.

In order that those skilled in the art may better understand how the present invention may be practiced, the following examples are given by way of illustration, and not by way of limitation.

EXAMPLE 1

This example illustrates the preparation of a polyvinylacetate-vinyl-stopped dimethylpolysiloxane dispersion, containing 40% by weight polyvinyl acetate, according to this invention.

A mixture of 20 grams of vinyl acetate monomer, 30 grams of low molecular weight vinyl-stopped dimethylpolysiloxane fluid having a viscosity of 300 centipoise at 25° C and 0.08 grams of azobis(isobutyronitrile) is put into a 100 ml. resin flask equipped with a stirrer, nitrogen inlet, reflux condenser, and oil bath. The system is flushed with nitrogen, stirred and heated to 75° to 95° C for about 1½ hours. A viscous, white dispersion is obtained which, while hot, is vacuum stripped to remove unreacted material.

EXAMPLE 2

This example illustrates the preparation of a polystyrene-vinyl stopped dimethylpolysiloxane dispersion, containing 40% by weight polystyrene, according to this invention.

Into a one liter resin flask, equipped with stirrer, thermometer, addition funnel, nitrogen inlet, condenser and oil bath, is placed 180 grams of low molecular weight vinyl-stopped dimethylpolysiloxane fluid having a viscosity of 300 centipoise at 25° C. 120 grams of styrene monomer is placed in the addition funnel. The vinylstopped dimethylpolysiloxane fluid is heated in a nitrogen atmosphere to a bath temperature of about 90° C and 1.2 grams of t-butyl peroctoate is added thereto. The styrene monomer is added dropwise to the heated vinyl-stopped dimethylsiloxane reaction mixture during a 1½ hour period. The resulting product, which is a white dispersion, is kept hot for an additional 1½ hours and the residual low boilers are removed under vacuum. The yield of product is 295 grams having a Brookfield viscosity of 1450 centipoise at 25° C and passes through a 330-mesh screen using a pressure filter.

EXAMPLE 3

This example illustrates the preparation of another polystyrene-vinyl stopped dimethylpolysiloxane dispersion, containing 40% by weight polystyrene, according to this invention.

Using the same equipment and procedure as in Example 2 above, 240 grams of styrene are added to 360 grams of vinyl-stopped dimethylpolysiloxane having a viscosity of 3,500 centipoise at 25° C and 2.4 grams of t-butyl peroctoate. The 587 grams of stripped product has a nonNewtonian viscosity in the range of from 87,000 to 195,000 centipoise at 25° C.

EXAMPLE 4

This example illustrates the preparation of a room temperature vulcanizable composition and cured product thereof according to this invention.

A mixture of 20 grams of the dispersion prepared according to Example 2, 0.48 grams of a copolymer of $(CH_3)_2SiHO$ with $SiO_2$ and 0.01 cc of a 5% platinum complex with divinyl tetramethylsiloxane in xylene (similar to the platinum catalysts of U.S. Pat. No. 3,775,452 by Karstedt incorporated herein by reference, is poured into an open mold and kept at room temperature. Onset of crosslinking is noted in about 15 minutes. After 16 hours, the cured composition has the following properties: 62 Shore A hardness, 510 psi tensile strength, 70% elongation and 11 pi tear.

EXAMPLE 5

This example illustrates the preparation of a room temperature vulcanizable composition and cured product thereof according to this invention.

A mixture of 72 grams of the dispersion prepared according to Example 3, 0.01 grams of the platinum complex of Example 4 and 1.0 grams of the silicon hydride of Example 4 is pressed in a mold at room temperature for one day. After three days the cured product has the following properties: 36 Shore A hardness, 980 psi tensile strength and 18 pi tear.

EXAMPLE 6

This example illustrates the preparation of another room temperature vulcanizable composition and cured product thereof according to this invention.

A mixture of 36 grams of the dispersion prepared in Example 3, 0.01 cc of a 1% platinum complex with methylvinylsiloxane tetramer and 0.6 grams of the silicon hydride of Example 4, are cured to a final rubber product having the following properties: 43 Shore A hardness, 1,060 psi tensile strength, 220% elongation and 14 pi tear.

EXAMPLE 7

This example illustrates the preparation of another room temperature vulcanizable composition and cured product thereof according to this invention.

A mixture of 13 grams of the dispersion of Example 1, 0.3 cc of the silicon hydride of Example 4 and 1 drop of a solution containing a 3½% platinum complex similar to that of Example 6 is cured at room temperature overnight to a rubbery product having good properties.

Obviously, other modifications and variations of the present invention are possible in the light of the above teachings. It is therefore to be understood that changes may be made in the particular embodiments of this invention which are within the full intended scope of the invention as defined by the appended claims.

I claim:

1. A stable polymer-filled vinylorganopolysiloxane dispersion comprising two phases:
    i. a continuous phase comprising an essentially ungrafted vinylorganopolysiloxane fluid and intimately dispersed therein
    ii. a discontinuous phase comprising finely divided solid particles of an ungrafted polymer prepared from an organic monomer having aliphatic unsaturation or a mixture of such monomers polymerized in the presence of said vinylorganopolysiloxane.

2. The dispersion of claim 1 wherein said essentially ungrafted vinylorganopolysiloxane has structural units corresponding to the formula

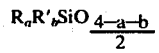

wherein R is selected from the group consisting of a monovalent hydrocarbon radical, a halogenated monovalent hydrocarbon radical, a cyanoalkyl radical and mixtures thereof; R' is vinyl; a has a value of from 0 to 2.5, inclusive; b has a value of from 0.0005 to 2.0, inclusive, and the sum of a and b is equal to from 1.0 to 3, inclusive.

3. The dispersion of claim 1 wherein said polymer is a homopolymer of said organic monomer.

4. The dispersion of claim 1 wherein said polymer is a copolymer of two or more of said organic monomers.

5. The dispersion of claim 2 wherein R is selected from the group consisting of alkyl, cycloalkyl, aryl, aralkyl, haloalkyl, halogenated cycloalkyl, haloaryl, halogenated aralkyl, cyanoalkyl and mixtures thereof.

6. The dispersion of claim 2 wherein R is methyl.

7. The dispersion of claim 2 wherein said organic monomer is selected from the group consisting of an ethylenically unsaturated hydrocarbon, a vinyl halide, a vinyl ester, styrene, vinyl pyridine, vinyl naphthalene, acrylic acid, esters of acrylic acid, amides of acrlic acid and acrylonitrile.

8. The dispersion of claim 2 wherein said essentially ungrafted vinylorganopolysiloxane is a vinyl-stopped diorganopolysiloxane having the general formula

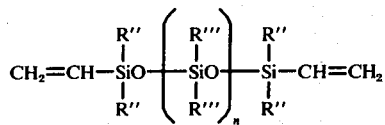

wherein R'' and R''' may be the same or different and are monovalent hydrocarbon radicals free of aliphatic unsaturation with at least 50 mole percent of the R''' group being methyl and wherein n has a value sufficient to provide a viscosity of from about 50,000 to 750,000 centipoise at 25° C.

9. The dispersion of claim 2 wherein said essentially ungrafted vinylorganopolysiloxane is a vinyl-stopped dimethylpolysiloxane.

10. The dispersion of claim 2 wherein said essentially ungrafted vinylorganopolysiloxane is present in an amount of from about 30% to about 95% by weight of the total dispersion and said polymer is present in an amount of from about 5 to about 70% by weight of the total dispersion.

11. The dispersion of claim 2 which further includes an inorganic filler.

12. The dispersion of claim 11 wherein said inorganic filler is selected from the group consisting of silica, carbon black, calcium carbonate, and iron oxide.

13. A room temperature vulcanizable composition comprising
    A. a stable dispersion comprising two phases:
        i. a continuous phase comprising an essentially ungrafted vinylorganopolysiloxane and intimately dispersed therein
        ii. a discontinuous phase comprising finely divided solid particles of a polymer prepared from an organic monomer having aliphatic unsaturation or mixture of said monomers polymerized in the presence of said vinylorganopolysiloxane;
    B. a crosslinking organohydrogenpolysiloxane; and
    C. a platinum catalyst.

14. The room temperature vulcanizable composition of claim 13 wherein said essentially ungrafted vinylorganopolysiloxane has structural units corresponding to the formula

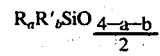

wherein R is selected from the group consisting of a monovalent hydrocarbon radical, a halogenated monovalent hydrocarbon radical, a cyanoalkyl radical, and mixtures thereof; R' is vinyl; a has a value of from 0 to 2.5, inclusive, b has a value of from 0.0005 to 2.0, inclusive, and the sum of a and b is equal to from 1.0 to 3, inclusive; and wherein said crosslinking organohydrogenpolysiloxane has structural units corresponding to the formula

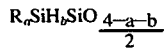

wherein R is selected from the group consisting of a monovalent hydrocarbon radical, a halogenated monovalent hydrocarbon radical, a cyanoalky radical and mixtures thereof; $a$ has a value of from 0 to 2.5, inclusive, $b$ has a value of from 0.005 to 2.0, inclusive, and the sum of $a$ and $b$ is equal to from 0.8 to 3, inclusive.

15. The room temperature vulcanizable composition of claim 14 wherein R is selected from the group consisting of alkyl, cycloalkyl, aryl, aralkyl, haloalkyl, halogenated cycloalkyl, haloaryl, halogenated aralkyl, cyanoalkyl and mixtures thereof.

16. The room temperature vulcanizable composition of claim 15 wherein R is methyl.

17. The dispersion of claim 14 wherein said essentially ungrafted vinylorganopolysiloxane is a vinyl-stopped diorganopolysiloxane having the general formula

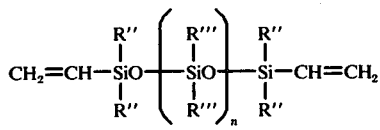

wherein R'' and R''' may be the same or different and are monovalent hydrocarbon radicals free of aliphatic unsaturation with at least 50 mole percent of the R''' group being methyl and wherein $n$ has a value sufficient to provide a viscosity of from about 50,000 to 750,000 centipoise at 25° C.

18. The room temperature vulcanizable composition of claim 14 wherein said essentially ungrafted vinylorganopolysiloxane is a vinyl-stopped dimethylpolysiloxane.

19. The room temperature vulcanizable composition of claim 14 wherein said orgaic monomer is selected from the group consisting of an ethylenically unsaturated hydrocarbon, a vinyl halide, a vinyl ester, styrene, vinyl pyridine, vinyl naphthalene, acrylic acid, esters of acrylic acid, amides or acrylic acid and acrylonitrile.

20. The room temperature vulcanizable composition of claim 14 wherein said essentially ungrafted vinylorganopolysiloxane is present in an amount of from about 30% to about 95% by weight of the total dispersion and said polymer is present in an amount from about 5 to about 70% by weight of the total dispersion.

21. The room temperature vulcanizable composition of claim 14 which further includes an inorganic filler.

22. The room temperature vulcanizable composition of claim 21 wherein said inorganic filler is selected from the group consisting of silica, carbon black, calcium carbonate and iron oxide.

23. The cured product of claim 13.

24. The cured product of claim 14.

25. The cured product of claim 18.

* * * * *

UNITED STATES PATENT AND TRADEMARK OFFICE
CERTIFICATE OF CORRECTION

PATENT NO. : 4,014,851
DATED : March 29, 1977
INVENTOR(S) : Ben A. Bluestein

It is certified that error appears in the above-identified patent and that said Letters Patent are hereby corrected as shown below:

Claim 7, line 5, "acrlic" should read --acrylic--.

Claim 19, line 2, "orgaic" should read --organic--.

In the specification, column 4, line 62, "cyanalkyl" should read --cyanoalkyl--

Signed and Sealed this nineteenth Day of July 1977

[SEAL]

Attest:

RUTH C. MASON
*Attesting Officer*

C. MARSHALL DANN
*Commissioner of Patents and Trademarks*